C. C. WILLIAMS.
LOCK NUT.
APPLICATION FILED APR. 29, 1918.

1,294,994.

Patented Feb. 18, 1919.

INVENTOR
Charles C. Williams
BY
George C. Dean ATTORNEY ced into its hole and then dropping a hardened ball on top.  It also acts as the result.  UNITED STATES PATENT OFFICE.

CHARLES C. WILLIAMS, OF DETROIT, MICHIGAN, ASSIGNOR TO EVERTITE NUT CORPORATION, OF DETROIT, MICHIGAN, A CORPORATION OF NEW YORK.

LOCK-NUT.

1,294,994.

Specification of Letters Patent.   Patented Feb. 18, 1919.

Application filed April 29, 1918.   Serial No. 231,507.

*To all whom it may concern:*

Be it known that I, CHARLES C. WILLIAMS, a citizen of the United States, and resident of Detroit, in the county of Wayne and State of Michigan, have invented certain new and useful Improvements in Lock-Nuts, of which the following is a specification.

My present invention relates to lock nuts of the type in which a locking ball is arranged in a cylindrical passage drilled in from the side of the nut in such direction that it will break into the threaded interior more or less tangentially so that when the nut is screwed on to the bolt, the ball contacting with the bolt threads will be rolled along the drill passage in a direction away from the pinching point when the nut is screwed on, and toward the pinching point when the nut is screwed off.

It relates more particularly to devices of the above type in which the nuts are the ordinary commercial nuts, usually of iron or mild steel and preferably hexagonal in outline and in which steel balls such as are ordinarily used for ball bearings, are utilized as the locking balls and in which a spring is used to yieldingly force the locking ball into engagement with the bolt threads.

In certain cases where the ball passage is drilled so as to intersect the bolt threads to a considerable depth the tangential relation results in opening a considerable length of the ball passage into the bolt thread space. It results that when the nut is not in place on the bolt, the spring cavity is open for admission of sand, metallic particles, etc., through the thread openings, and when the nut is in use the forward end of the spring is likely to engage the bolt threads and be nipped between them and the ball, particularly if attempt is made to unscrew the nut without first forcing the ball out of locking position. Moreover, in certain cases it is common to have the surface of the locking ball roughened so that it will readily bite into the threads of the bolt and this roughening causes undue friction at the point of engagement with the spring.

The principal object of my invention is to obviate or minimize these difficulties by inserting a polished ball between the locking ball and the spring. This affords anti-friction bearing surfaces for both the spring and the locking ball. It also puts the forward limit of movement of the spring a full diameter farther back away from the screw threads of the bolt in addition to affording a supplemental closure for the spring cavity a diameter in the rear of the locking ball.

A desirable embodiment of my invention is shown in the accompanying drawings, in which—

Figure 1:
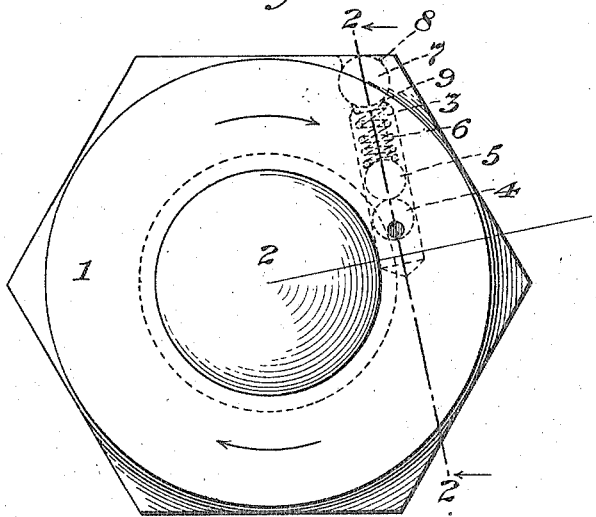
Figure 1 is a face view of a nut in position upon a bolt.
Figure 2:
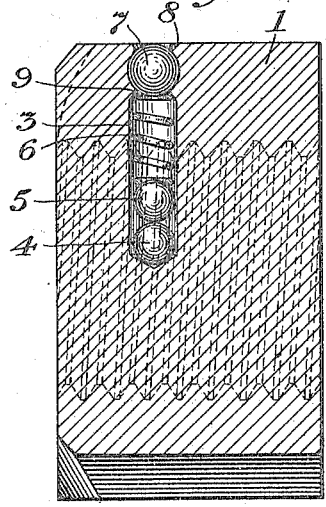
Fig. 2 is a section on the line 2—2, Fig. 1.

In these drawings, the nut 1, adapted to fit bolt 2, has a hole 3 drilled in from one side so as to break into the threads of the nut more or less tangentially.

The locking ball 4 is dropped into the hole, the polished ball 5 is dropped in on top of the roughened ball, the spring 6 is inserted behind the polished ball and the hole is then closed by any suitable means.

As shown in the drawings, the means employed is another ball 7 preferably about one one-hundredth of an inch greater diameter than the drill hole and pressed into the hole by powerful pressure or hammering. The metal bur or collar forced out of the hole upon entry of the ball is forced in behind it to afford a closure as at 8 leaving the surface of the nut flat, the ball 7 being tightly held between the closure 8 and the annular bead 9 which is forced ahead of it as it is driven into the drill hole.

The intermediate polished ball 5 serves as a smooth anti-friction bearing for the locking ball 4 and for the forward end of the spring 6. It also decreases the extent of forward movement of the spring by an amount equal to the diameter of the ball so that when the nut is in use the spring cannot follow forward far enough to be pinched by coming into engagement with the bolt threads. Moreover, it affords a further closure tending to prevent admission of sand, etc., to the spring containing part of the ball passage.

When the finished nut is screwed on the bolt, the thread of the bolt serves to force the locking ball 11 back, compressing the spring between the locking ball and the plug ball thus maintaining the latter in firm contact with the thread of the bolt. In this condition, any attempt to unscrew the nut serves to roll the ball into pinching engagement with the thread. In all ordinary cases the locking ball 8 may be forced back out of locking position by inserting a pin through the hole 14, but where great violence has been used and the ball has been rolled in to the bottom of the hole, the ball can only be brought back within range of operation of the pin by slightly screwing the nut downward, thus rolling it out of tangent position but in the extreme case where the unscrewing has been sufficiently violent to strip a considerable amount of metal, the nut cannot be removed except by destroying the bolt or nut or both.

From the detailed explanation of the principles of my invention first above given, and the further description of the desirable embodiment thereof shown in the drawings, any one skilled in the art will be able to apply the same to various sizes and models of nuts and to nuts having screw-threads of different pitch, depth or cross-section.

I claim:

1. A nut formed with interior screw threads and a passage breaking into said threads, a locking ball loosely fitting said passage and a spring for forcing said ball into locking relation with the screw threads of the bolt when the nut is screwed thereon, in combination with another ball interposed between said locking ball and said spring.

2. A nut formed with interior screw threads and a passage breaking into said threads, a steel locking ball having a roughened surface loosely fitting said passage and a spring for forcing said ball into locking relation with the screw threads of the bolt when the nut is screwed thereon, in combination with a polished steel ball interposed between said locking ball and said spring.

3. A nut formed with interior screw threads and a transverse hole drilled in from the side of the nut and breaking into said threads tangentially and a spring for forcing said ball into locking relation with the screw threads of the bolt when the nut is screwed thereon, in combination with a polished steel ball interposed between said locking ball and said spring and a closure for said drill hole consisting of another polished steel ball slightly larger than the drill hole, forced into the mouth thereof and retained by metal of the nut forced into the mouth of the hole behind the said ball.

Signed at Detroit, in the county of Wayne, and State of Michigan this 25th day of April, A. D. 1918.

CHARLES C. WILLIAMS.

Copies of this patent may be obtained for five cents each, by addressing the "Commissioner of Patents, Washington, D. C."